United States Patent Office 3,467,646
Patented Sept. 16, 1969

3,467,646
NOVEL FOAMS AND METHODS FOR
THEIR PRODUCTION
Charles P. West, Metuchen, and Alan E. Weinberg,
Verona, N.J., and William F. Oliver, New Cassel, and
Rafael J. Perez, Flushing, N.Y., assignors to U.S. Plywood-Champion Papers Inc.
No Drawing. Filed May 13, 1965, Ser. No. 455,596
Int. Cl. C08f 47/10; C08g 53/10
U.S. Cl. 260—2.5        23 Claims

ABSTRACT OF THE DISCLOSURE

Flexible or rigid foam reaction products of polymerized diolefins produced by the interaction of a liquid diene polymer, a rosin and/or fatty acid, and sulfur monochloride.

---

This invention is directed to novel foam products produced by the interreaction of a diene polymer, at least one member of the group consisting of rosin and fatty acids, and sulfur monochloride. The invention includes foam products of both the flexible type and the rigid type.

The diene polymers chemically incorporated in these foams are synthetic low molecular weight polymers of a butadiene, and include homopolymers and copolymers of butadiene and alkyl, aryl and substituted derivatives thereof. We prefer to use unsaturated liquid diene polymers having molecular weights in the range of roughly about 500 to 5,000. Polymers we have found to be particularly useful for this purpose include butadiene homopolymers and copolymers with styrene, butadiene-acrylic acid copolymers, butadiene-methacrylic acid copolymers, and butadiene-acrylonitrile copolymers, and mixtures thereof.

By the term "rosin," as used herein, is meant a resin which consists essentially of various forms of abietic acid. The rosin used may be common wood rosin, obtained as a residue in the distillation of crude turpentine, or it may be a gum rosin or a tall oil rosin.

Fatty acid may be used in addition to or in place of rosin for reaction with the diene polymer and sulfur monochloride. Suitable fatty acids for use herein include both natural and synthetically produced oleic and linoleic acids and, more generally, mixtures containing unsaturated straight and branched chain aliphatic acids having about 10 to 22 carbon atoms per molecule.

Sulfur monochloride is conventionally represented by the formula $S_2Cl_2$, and is a fuming liquid having a specific gravity of 1.69 at room temperature. The precise nature of its reaction in the practice of this invention is not known, but we presently believe that it forms an —S— or —S—S— bond which links polymer chains formed from the diene polymer, rosin and fatty acid. The sulfur monochloride also produces gaseous reaction products which contribute to the "blow" or generation of the foam.

Broadly put, the foams we have invented ar the chemical reaction product of a mixture in the liquid state consisting essentially of a butadiene polymer, a member of the class consisting of unsaturated rosins and fatty acids and mixtures thereof and sulfur monochloride.

In accordance with one embodiment of this invention, a foam is produced by the interreaction of rosin or fatty acids or a mixture of rosin and fatty acids, together with sulfur monochloride and a diene polymer such as a butadiene homopolymer as the essential constituents. The reaction is preferably but not necessarily carried out in the presence of a non-reactive organic solvent for the diene polymer such as pentane.

In accordance with a modified embodiment of the invention, the molecular weight of all or a portion of one or more of the diene polymer, rosin and fatty acid components of the foam is first increased by a preliminary reaction to which we refer hereinafter as "bodying," to produce a partially reacted viscous liquid of higher molecular weight which is thereafter reacted with other reaction constituents in place of or in addition to the corresponding unbodied material to produce the foam. Such bodying is especially advantageous in that it enables foams of higher compressive strength to be obtained.

Both flexible and rigid foams may be produced by these methods, depending upon the proportions of ingredients and reaction conditions.

The reaction of the essential foam components is advantageously carried out in the presence of an organic solvent for the diene polymer such as a Freon, pentane or naphtha. While the boiling range of the solvent is not especially critical, a solvent having a boiling point in the range of about 5 to 110° F. is especially useful, as will be shown.

As previously expressed, either rosin or fatty acid or a mixture of both may be reacted with the diene polymer and sulfur monochloride to produce foams. An inexpensive widely available material which comprises a mixture of rosin and fatty acids and which is suitable for use herein is crude or refined tall oil. Crude tall oil is a by-product of the sulfate process for making pulp from pine, and is a heterogeneous and variable mixture which is nonvolatile under conditions of the pulping process. Roughly about 90% of crude tall oil is composed of acidic materials which usually comprise approximately equal parts of rosin and fatty acids, and the remainder is a complex mixture of fatty acid esters, sterols, higher alcohols, hydrocarbons and decomposition products. The fatty acids in tall oil are mainly oleic and linoleic acids. Abietic acid and its derivatives are the major rosin acids in crude tall oil.

In the pulping of wood the fatty acids and rosin acids present in wood dissolve in the liquor as sodium soaps. These soaps or crude tall oil skimmings rise to the surface of the black liquor as the total solids content is increased and as the liquor starts to cool. Addition of a mineral acid such as sulfuric acid forms the mixture of rosin and fatty acids which constitutes the crude tall oil of commerce.

There are also available various refined or purified grades of tall oil. Some of these consists largely of the fatty acid components of crude tall oil, from which the rosin acid content has largely been removed, and such high fatty acid purified forms of tall oil are also contemplated for use herein, together with other purified tall oils.

Examples of commercially available liquid diene polymers which we have found to be suitable for interreaction with rosin and/or fatty acid and sulfur monochloride to produce foams include:

"Buton 100," a liquid copolymer of butadiene and styrene in 3–4:1 weight ratio comprising 65% 1, 2 adduct and 35% 1, 4 adduct, having a molecular weight of about 2,000–2,600, an iodine number of about 275 to 330, and a viscosity of 3,500 poise, produced by Enjay Corporation;

"Buton 150," a liquid butadiene homopolymer having a molecular weight of about 2,500–3,500, an iodine number of about 410, comprising 65% 1, 2 adduct and 35% 1, 4 adduct, produced by Enjay Corporation;

"Butarez CTL," Type II, an acid-terminated liquid copolymer of butadiene and acrylic acid having a carboxy content of 1.66%, and a molecular weight of 5500, produced by Phillips Petroleum;

"SR-1," a liquid copolymer of butadiene and methacrylic acid, produced by Sinclair Refining;

"Hycar 1312," a liquid copolymer of butadiene and acrylonitrile of medium-high acrylonitrile content and low molecular weight, having a Brookfield viscosity of 20,000 (No. 4 Spindle) at 50° C., produced by B. F. Goodrich.

The practice of the invention in simple form, without special additives that may be incorporated to obtain further product refinement, is illustrated in Table 1. (All formulae set forth herein are based upon 100 parts of the diene polymer, and all quantities are parts by weight per 100 parts polymer unless otherwise noted.)

In the tables herein, foaming characteristics and physical properties of the foams are given where measured. Even in those cases where the properties are not given, however, the examples represent actual compositions which were compounded and from which foams were made.

was used to lower the viscosity of the diene polymer to facilitate uniform mixing and as a propellant or blowing agent. The reaction between the diene polymer, sulfur monochloride and rosin and/or fatty acid is exothermic and the heat released volatizes the pentane which then contributes to the generation of a foam.

While the examples of Table I illustrate the basic reaction contemplated by the invention, we have further found that improvements in uniformity of cell size, fineness of cell structure, and reduction of foam density can be obtained by the incorporation into the reaction mixture of certain additional components. These optional additive agents include sodium silicate, an alkali metal carbonate or bicarbonate, and various wetting gents disclosed hereafter.

The effect of sodium silicate and a preferred wetting agent, DC–232, can be seen from Example 14 follow-

TABLE I

| | Example No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Buton 100, wt | 100 | 100 | 100 | 100 | 100 | 100 | 100 | 100 | 100 | 100 | 100 | 100 | 100 |
| Rosin | 6.7 | 11.1 | 22.2 | 44.5 | | | 2.7 | 6.7 | | | 6.7 | | |
| Fatty acid | | | | | 6.7 | 44.5 | 6.7 | 11.1 | | | | | |
| Crude tall oil | | | | | | | | | 6.7 | 6.7 | 6.7 | 20 | 40 |
| $S_2Cl_2$ | 22.5 | 22.5 | 22.5 | 22.5 | 22.5 | 22.5 | 22.5 | 22.5 | 22.5 | 22.5 | 22.5 | 22.5 | 22.5 |
| Pentane | 26.7 | 26.7 | 26.7 | 26.7 | 26.7 | 26.7 | 26.7 | 26.7 | 26.7 | 26.7 | 26.7 | 26.7 | 26.7 |
| $H_2O$ | | | | | | | | | | | 6.7 | | |
| Foam start, minutes | 3 | 1½ | ½ | ¼ | 18 | 6 | 10 | 1½ | | 1 | 1½ | 1 | ½ |
| Foam stop, minutes | 4 | | 2½ | | | | | | | 2½ | 4 | 1¾ | 2½ |
| Gel, minutes | 3½ | 4 | 2 | 2 | 18 | 7 | | 3½ | 6 | 2 | 3½ | 2¼ | 1¾ |
| Density, p.c.f | 12.9 | | 5.4 | 2 | | 10–11 | | 10.3 | | 5.4 | 9.6 | 7.8 | 4.4 |

Examples 1–4 illustrate formulations for foam based upon a butadiene-styrene copolymer, tall oil rosin, and sulfur monochloride, in the presence of pentane. In the production of these foams the butadiene polymer was first dissolved in the pentane to reduce its viscosity and to enable the rosin and sulfur monochloride to be mixed and reacted with it more homogeneously. It can be seen that increasing the proportion of rosin from 6.7 to 44.5/100 parts diene polymer, at constant solvent and $S_2Cl_2$ levels, has the effect of causing the foaming action to start sooner, gelling to occur more quickly, and foam density to be markedly reduced.

Examples 5–6 illustrate the production of foams from a butadiene-styrene copolymer, tall acid fatty acid and $S_2Cl_2$. Increasing the fatty acid/diene polymer ratio from 0.067 to 0.445 at constant solvent and $S_2Cl_2$ levels causes the foam to form and gel more quickly.

Examples 7 and 8 illustrate the reaction of a synthetically prepared mixture of rosin and fatty acids with a butadiene-styrene copolymer and sulfur monochloride. Examples 9 through 13 illustrate the use of crude tall oil having a rosin content of about 40%, the formulation of Example 11 also including a quantity of separately added rosin. From a sequential comparison of Examples 9, 12, and 13, it will be observed that increasing the tall oil/diene polymer ratio from 0.067 to 0.40 progressively shortens foam time. This also tends to reduce density. Examples 10 and 11 show the addition of water and rosin, which shorten foam time and reduce density at a given tall oil content.

Relatively low foam densities are usually achieved when rosin is used in place of fatty acid. Incorporating a substantial content of rosin, i.e., above about 5% of the weight of the diene polymer, increases the rate of foaming and will increase foam rise during reaction. For these same reasons, where tall oil is used we prefer that it have a rosin content of about 20% or more, and that additional rosin be added to it.

In the foregoing examples, the pentane solvent utilized did not chemically enter into the reaction but rather ing, which presently constitutes our preferred formulation for flexible foam:

Example 14

| | Parts by wt. |
|---|---|
| Buton 100 | 100 |
| Wood rosin | 2.7 |
| Crude tall oil | 6.7 |
| $S_2Cl_2$ | 22.5 |
| Pentane | 26.7 |
| $Na_2SiO_3$ solution, 47° Bé. | 0.7 |
| Dow Corning "232" | 0.7 |

All of the components except the $S_2Cl_2$ were first mixed for about a minute in a counter-rotating mixer. Mixing the other components prior to addition of $S_2Cl_2$ enables better homogeneity to be achieved, because foaming begins quickly upon addition of the $S_2Cl_2$. After mixing in the $S_2Cl_2$ the mixture is permitted to set in a mold of desired shape. Foam generation or blowing with this formulation begins quite rapidly, typically within a few seconds, after addition of the $S_2Cl_2$, and the reaction mass rises in the mold as foaming occurs. Mixing may be terminated once foaming begins, in order to minimize density.

The tall oil used in this example was a crude tall oil comprising about 36–46% rosin, 45–55% fatty acids and 8% unsaponifiables, 0–1.5% moisture, and had an acid number of 160–170 and a saponification number of 165–175. Its iodine value was 140–150.

The sodium silicate employed may for example be a 47° Baumé aqueous solution, containing about 11% $Na_2O$ and 31.9% $SiO_2$ by weight. It serves as a cell nucleating agent and supplies a small amount of water which accelerates the reaction. We have found it to be surprisingly effective in contributing to a finer, more uniform cell formation. As compared with Example 7, which contained the same proportions of rosin and tall oil and $S_2Cl_2$, the formulation of Example 14 was lighter and substantially more uniform. While the use of $Na_2SiO_3$ is not necessary in the sense that a foam cannot be produced in its absence, we consider it to be highly desirable.

The most useful range of addition of the 47° sodium silicate solution is about 0.5 to 30.0 parts per hundred parts diene polymer although use of ratios greater than about 0.02 does not give commensurately improved results.

DC–232 is a dimethyl polysiloxane surfactant produced by the Dow Corning Corporation. It has the effect of making the cells of the foam finer and causing a higher rise. The use of this or another comparable surfactant is therefore desirable, although not absolutely necessary. Other surfactants which have been tried and found suitable for such use, without intending to exclude others, include:

"Triton X–200"— Sodium alkylarylpoly (ethylene-oxy) sulfonate, produced by Rohm & Haas;
"Igepal CO 210," "630," and "990"—Nonyl phenoxypoly (ethylene-oxy) ethanols, with increasing amounts of ethylene oxide per molecule, produced by Antara Chemicals;
"UC L520" and "UC L530"—Organo-silicone copolymers, produced by Union Carbide;
"DC–199," "DC–200," and "DC–201"—Silicone-glycol copolymers, produced by Dow Corning;
"DC–EF–4527"—Silicone glycol copolymer water emulsion, produced by Dow Corning;
"XF 1034"—Dimethyl polysiloxane-polyoxyalkylene copolymer, produced by General Electric; and
"Accobrite N"—Potassium rosinate.

Most useful proportions of the surfactant are about 0.5 to 5.0 parts per hundred polymer.

One or more other solvents or propellants for the diene polymer such as "Freon–11" ($CCl_3F$, boiling point about 75° F.) or naphtha may be used in place of some or all of the pentane (B.P. about 97° F.). Solvents of higher boiling points such as VM & P naphtha (B.P. 200–300° F.) have a generally opposite effect, providing longer working periods before the start of rise, but total rise is reduced. In general, any solvent for the diene polymer or $S_2Cl_2$ may be used, but we prefer aromatic or aliphatic solvents which are completely inert toward $S_2Cl_2$. The most useful total proportions of solvents such as pentane and naphtha are from about 10 to 60 per one hundred parts diene polymer, although it will be appreciated that certain polymers will be more soluble in given solvents than others and the proportions should be varied accordingly. Most useful Freon-11/diene polymer ratios are about 0.05–0.30, and of course depend upon the pressure of other solvents, rosin and fatty acid contents, desired density, etc.

Pulverized sodium carbonate or bicarbonate may be added as a secondary blowing agent, and has the effect of functioning to control foam density. Optimum proportions are 0.2 to 30 parts per hundred polymer. These decompose to evolve $CO_2$. Moreover, it is believed that the alkali reacts with HCl evolved from the reaction of the $S_2Cl_2$, to form NaCl. Since this reduces the acidity of the foam, it is especially useful if the proportion of carbonate or bicarbonate is in substantial stoichiometric balance with the quantity of HCl produced by the $S_2Cl_2$ which is to be incorporated into a given formulation.

In Table II following there are illustrated a number of various composition formulae for foams in accordance with the invention which are made with various diene polymers at different sulfur monochloride proportions and with different solvents, surfactants, and at varying proportions of sodium silicate and bicarbonate. In all examples the tall oils used had rosin contents of about 40%.

TABLE II

| | Example Number | | | | | | | | | | | | |
|---|---|---|---|---|---|---|---|---|---|---|---|---|---|
| | 15 | 16 | 17 | 18 | 19 | 20 | 21 | 22 | 23 | 24 | 25 | 26 | 27 |
| Diene polymer, wt.: | | | | | | | | | | | | | |
| Buton 100 | 100.0 | 100.0 | 100.0 | 100.0 | 100.0 | 100.0 | 100.0 | 100.0 | 100.0 | 100.0 | 100.0 | 100.0 | 100.0 |
| Other | | | | | | | | | | | | [1] 100.0 | [1] 100.0 |
| Tall oil | [3] 6.7 | [3] 6.7 | [3] 10.0 | [3] 13.3 | [3] 13.3 | [3] 13.3 | [3] 13.3 | [3] 13.3 | [4] 100.0 | [4] 100.0 | [4] 100.0 | [2] 6.7 | [3] 6.7 |
| $S_2Cl_2$ | 22.5 | 22.5 | 84.5 | 21.6 | 42.2 | 50.0 | 56.3 | 73.0 | 112.5 | 112.5 | 142.1 | 22.5 | 22.5 |
| Solvent | [5] 20.0 | [5] 16.7 | [6] 33.3 | [5] 16.7 | [6] 16.7 | [5] 16.7 | [6] 16.7 | [6] 33.3 | [6] 33.3 | [5] 16.7 | [5] 16.7 | [5] 33.3 | [5] 33.3 | [5] 33.3 | [5] 16.7 | [5] 16.7 |
| Freon–11 | 6.7 | 10.0 | | 10.0 | 10.0 | 16.7 | 16.7 | 10.0 | 20.0 | 20.0 | 20.0 | 10.0 | 10.0 |
| $Na_2SiO_3$ | 0.7 | 0.7 | 26.7 | 0.7 | 0.7 | 10.0 | 10.0 | 0.7 | | | | 0.7 | 0.7 |
| 47° Bé solution: | | | | | | | | | | | | | |
| $NaHCO_3$ | | 1.0 | 20.0 | 13.3 | 13.3 | 13.3 | 13.3 | 13.3 | 26.7 | 20.0 | 20.0 | 0.3 | 0.3 |
| Surfactant | | [7] 0.7 | [7] 0.7 | [7] 0.3 | [7] 0.7 | [7] 0.7 | [7] 0.4 | [7] 0.7 | [7] 1.3 | [7] 1.3 | [7] 1.3 | [7] 0.7 | [7] 0.7 |
| Foam type | [8] | [8] | [9] | [8] | | | | | [9] | [9] | | | [9] |
| Density, p.c.f. | 3.9 | 5.4 | | | 1.6 | | | 2.2 | 1.6 | 1.4 | 1.6 | | |

| | Example Number | | | | | | | |
|---|---|---|---|---|---|---|---|---|
| | 28 | 29 | 30 | 31 | 32 | 33 | 34 | 34A | 34B |
| Diene polymer, wt.: | | | | | | | | | |
| Buton 100 | | 100.0 | 100.0 | 100.0 | 100.0 | 100.0 | 100.0 | 100.0 | 100.0 |
| Other | [10] 100.0 | | | | | | | | |
| Tall oil | [3] 100.0 | [3] 3.3 | [3] 23.3 | [3] 23.3 | [3] 20.0 | [3] 20.0 | [3] 20.0 | | |
| Rosin | | | | | | | | 2.7 | 5.3 |
| $S_2Cl_2$ | 85.4 | 84.4 | 84.4 | 84.4 | 84.4 | 84.4 | 84.4 | 22.5 | 22.5 |
| Solvent | [5] 33.3 | [6] 16.7 | [6] 16.7 | [6] 33.3 | [6] 33.3 | [6] 33.3 | [6] 33.3 | [5] 16.7 | [5] 16.7 |
| Freon–11 | 20.0 | | | | | | | 10.0 | 10.0 |
| $H_2O$ | | | | | (11) | (12) | | | |
| $Na_2SiO_3$, 47° Bé solution | 1.3 | | | | | | 26.7 | 0.7 | 0.7 |
| $NaHCO_3$ | 0.7 | 6.7 | 6.7 | 13.3 | 10.0 | 10.0 | 10.0 | | |
| Surfactant | [13] 4.0 | [7] 1.7 | [7] 1.7 | [7] 1.7 | [7] 1.7 | [7] 1.7 | [7] 1.7 | [13] 0.7 | [13] 0.7 |
| Foam type | (9) | (9) | (9) | (9) | (9) | (9) | (8) | (8) | (8) |
| Density, p.c.f. | | | | | | | | 4.9 | 3.7 |

[1] Buton 150. [2] SR–1. [3] Crude. [4] Ref. [5] Pentane. [6] VM&P. [7] DC–199. [8] Flexible. [9] Rigid. [10] Hycar–1312. [11] 33 drops. [12] 100 drops. [13] DC–232.

In each of the examples of Table II the sulfur monochloride was the last ingredient to be added. In those formulations containing Freon-11, we found it advantageous to blend in the Freon immediataely prior to adding the sulfur monochloride in order to minimize its volatilization prior to foaming.

Generally speaking, generation of the foam should proceed roughly apace with the curing reaction, so that the foam will be relatively stable as it is generated, and will be set before it might collapse. Where a large volume of foam is to be produced in a single batch, it may be desirable to apply cooling means to prevent reaction temperature from becoming excessive. The product will self-harden without further treatment, usually after 2 or 3 hours. The mixture may be reacted in a foaming gun, wherein an $S_2Cl_2$ stream is contacted with a stream containing the other ingredients in a mixing head and is fed continuously into a mold or onto a moving belt. The formulation of Example 14 is especially suitable for this purpose.

The density of a given foam composition will depend upon conditions of mixing, foam volume, the manner in which the monochloride is added, the absence or presence and quantity of rosin, quantity of blowing agents or volatilizing solvents, and other factors. Diene polymers of lower unsaturation than butadiene homopolymers, such as butadiene-styrene polymers having a butadiene-styrene weight ratio of less than 1.0, are believed to give more easily controllable foams and foams with low densities.

The most useful rosin/diene polymer ratios are presently believed to be about 0.05 to 0.50, and the most useful fatty acid/diene polymer ratios are also believed to be about 0.05 to 0.50. The ratio of total rosin and fatty acid to diene polymer should be at least about 0.05 and preferably should not exceed about 1.0. Similarly, where crude tall oil is used, tall oil/diene polymer weight ratios higher than about 1.0 generally produce foams which are relatively friable and of low compressive strength, although we have found that where strength is not critical, tall oil/diene ratios up to 1.60 may be used.

The proportions of sulfur monochloride incorporated can advantageously be in the range of about 15 to 150 parts by weight per one hundred parts diene polymer and generally should increase as the proportions of rosin and/or fatty acid increase. If the quantity of sulfur monochloride is excessive the product may tend to darken at the bottom or to foam with a proportion of undesirably large cells. These difficulties can usually be eliminated by reducing the proportions of sulfur monochloride.

Thus by way of illustration the reaction described can be effected with a starting mixture consisting essentially of at least one liquid diene polymer selected from the class consisting of butadiene homopolymers, butadiene-styrene copolymers, butadiene-acrylic acid copolymers, butadiene-methacrylic acid copolymers and butadiene-acrylonitrile copolymers with at least one member of a second class consisting of rosin and fatty acid and sulfur monochloride in the presence of a solvent in which the diene polymer is soluble, wherein the rosin/polymer weight ratio is less than about 0.50 and the (rosin plus fatty acid)/polymer ratio is in the range of about 0.05–1.6 and the sulfur monochloride/polymer ratio is in the approximate range of about 0.15 to 1.5

At given proportions of rosin, fatty acid, and diene polymer, foam rigidity or flexibility depends primarily upon the proportions of sulfur monochloride utilized: increasing the proportion of $S_2Cl_2$ tends to make the foam more rigid or less flexible. For example, in a foam based upon 6.7 parts crude tall oil (i.e. about 3.3 parts fatty acid and 2.7 parts rosin acid) and 100 parts Buton 100, flexible foams are produced with $S_2Cl_2$ proportions up to about 27 parts per hundred Buton 100, while higher $S_2Cl_2$ contents lead to increasingly more rigid foams.

The optimum proportion of $S_2Cl_2$ to be used in a composition of given rosin, fatty acid, and diene polymer contents will depend upon the specific nature of the rosin and fatty acids (or tall oil), some grades or types having higher iodine numbers than others, the type of diene polymer, presence of other ingredients and particularly upon volatilizing ingredients, and so on. The appropriate quantity is readily determined in a given instance by preparing a series of foams having increasing $S_2Cl_2$ contents, the proportions of rosin, fatty acid and diene polymer being held constant from sample to sample. Even at constant rosin/fatty acid/diene polymer/$S_2Cl_2$ proportions, the foaming agents can be varied to change properties. Such tests to select appropriate operating proportions for a given type of foam are well within the capabilities of the polymer chemist based on the disclosure herein.

Tall oil, fatty acid or the diene polymer or a mixture thereof can be bodied in advance of the foam-producing reaction, by pre-reaction with a proportion of sulfur monochloride insufficient to cause gellation. The heat released in this step is dissipated prior to foam generation, and by this method better compressive strengths are obtained.

To carry out the prebodying effectively it is important that the proportion of $S_2Cl_2$ which is added be such as to cause thickening of the liquid to take place but without frothing, gellation or charring, which would render further reaction to be ineffective or inoperative or which would harm foam quality.

As an illustration of a preferred method of prebodying a butadiene-styrene copolymer, a solution of 100 grams of Buton 100 in 16.7 grams of pentane was charged into a flask equipped with stirring means and a condensor. Sulfur monochloride in the amount of 1.5 grams was slowly added to the stirred solution with a dropping funnel. Heat was evolved and the mixture thickened but did not foam or gel. A chemical reaction between the two components takes place, but we do not presently know the precise nature of the reaction product or products. Reaction of this product with additional $S_2Cl_2$ and tall oil to produce a foam is shown in Example 39 in Table III following.

Alternatively or in addition, fatty acids or tall oil can be prebodied in the same manner. The quantity of sulfur monochloride added should in any case be less than the amount, determinable by a series of tests, which causes the bodied product to set or gel in 24 hours or less.

Table III following shows the prebodying of diene polymers, tall oils and mixtures thereof, and the production of foams from the prebodied materials. In all cases the bodied products were unfoamed liquids.

TABLE III

| | Example No. | | | | | |
|---|---|---|---|---|---|---|
| | 35 | 36 | 37 | 38 | 39 | 40 |
| Prebodying: | | | | | | |
| Buton 100, gms | 100.0 | 100.0 | 100.0 | 100.0 | 100.0 | (1) |
| Solvent | | | | | ² 16.7 | |
| Tall oil | ³ 13.3 | ³ 13.3 | ³ 13.3 | ³ 100.0 | | 100.0 |
| $S_2Cl_2$ | 1.5 | 1.3 | 1.3 | 5.0 | 1.5 | 141.7 |
| Foam: | | | | | | |
| Bodied material | 100.0 | 100.0 | 100.0 | 100.0 | 100.0 | 100.0 |
| Coreactant | (¹) | ⁴ 1.2 | ⁵ 1.2 | (¹) | ⁵ 5.7 | ⁶ 41.8 |
| $S_2Cl_2$ | 37.6 | 37.6 | 37.6 | 37.6 | 24.1 | (¹) |
| Solvent | ² 14.7 | ² 14.7 | ² 14.7 | ² 14.7 | ² 14.3 | ² 13.8 |
| Freon-11 | 8.8 | 8.8 | 8.8 | 8.8 | 8.6 | 8.3 |
| $Na_2SiO_3$ | 0.7 | 0.7 | 0.7 | 0.7 | .6 | |
| 40% solution $NaHCO_3$ | | | | | 0.9 | |
| Surfactant | ⁷ 0.6 | ⁸ 0.6 | ⁸ 0.6 | ⁸ 0.6 | ⁹ 0.6 | ⁹ 0.5 |
| Foam type | (¹⁰) | (¹⁰) | (¹⁰) | (¹⁰) | | (¹⁰) |
| Density, p.c.f. | | 6.3 | 6.1 | 3.3 | | 4.4 |

¹ None.
² Pentane.
³ Ref.
⁴ Crude tall oil.
⁵ Ref. tall oil.
⁶ Buton 100.
⁷ DC-201.
⁸ DC-232.
⁹ DC-199.
¹⁰ Rigid.

In the production of foam from a prebodied ingredient, the prebodied material in reacted with additional tall oil and/or diene polymer and/or with sufficient additional $S_2Cl_2$ to produce a self-curing foam. As illustrated by Examples 35 and 38, where a mixture of tall oil and diene polymer is prebodied, the bodied material can be formed merely by the further addition of $S_2Cl_2$, without adding more diene polymer or tall oil. The bodied material of Examples 36 and 37 is reacted with additional tall oil and $S_2Cl_2$. Where tall oil is bodied in the presence of a large amount of $S_2Cl_2$, as in Example 40, sufficient $S_2Cl_2$ apparently remains available for further direct reaction so that upon blending in the diene component foam production takes place without additional $S_2Cl_2$.

Another method of increasing the molecular weight of the reaction ingredients is by bodying with heat, without necessarily using $S_2Cl_2$. According to this technique, the diene polymer, with which there may be mixed rosin or fatty acid or a mixture thereof such as tall oil, is heated to a temperature in the range of about 200–300° C. for a period of about one hour, or sufficiently long to thicken it without causing gellation. During such heating a preliminary polymerization reaction takes place. The resulting heat-bodied material is then reacted with sulfur monochloride and rosin and/or fatty acids to produce the foam.

This method may be used in conjunction with $S_2Cl_2$ prebodying, and in fact during $S_2Cl_2$ prebodying as described above, the heat of reaction may itself cause some heat prebodying.

The production of a foam with heat bodying of the reaction components are shown in the following example:

Example 41

One hundred grams of Buton 100 were heated for one hour at 220° C., to produce a liquid more viscous than the starting material. One hundred grams of this liquid were dissolved in 16.7 grams pentane and mixed with 6.7 grams of refined tall oil (40% rosin content), 0.7 gram $Na_2SiO_3$ solution, 0.7 $NaHC_3$, and 0.7 DC–199. Freon–11 was then added in the amount of 10.0 grams, followed by 22.7 grams of $S_2Cl_2$. A flexible foam was produced.

It is not necessary that the foam producing reaction be carried out in the presence of a solvent, although that is ordinarily advantageous. Foams were produced, for example, by interreacting a liquid diene polymer, tall oil, and sulfur monochloride, without a solvent, in the proportions given in Examples 42–45:

TABLE IV

| | 42 | 43 | 44 |
|---|---|---|---|
| Example No.: | | | |
| Diene polymer | Buton 100 | Buton 100 | SBR |
| Wt. of ploymer | 100 | 100 | 100 |
| Crude tall oil | 6.7 | 25 | 25 |
| $S_2Cl_2$ | 22.5 | 25.3 | 25.3 |

"SBR" is a liquid styrene-butadiene rubber.

Use of a solvent generally permits a homogeneous blend of the reaction components to be made more rapidly. Further, if the vapor pressure of the solvent utilized is sufficiently high at the temperatures produced by the curing exotherm, the solvent may contribute to the blow.

While we have described a preferred embodiment of our invention, those skilled in the art will recognize that the invention is susceptible of various modifications and variations within thhe scope of the following claims.

What is claimed is:

1. The method of producing a foam which comprises forming a mixture in the liquid state consisting essentially of a liquid diene polymer, a member of the class consisting of unsaturated rosins and unsaturated fatty acids having about 10 to 22 carbon atoms and mixtures thereof, and adding sulfur monochloride to said mixture in the liquid state in proportion sufficient, depending upon foam rigidity, flexibility or density desired, to cause said mixture to foam and cure.

2. The method of claim 1 wherein at least one of said polymer and member of said class has been thickened but not gelled by pre-reaction with sulfur monochloride.

3. The method of claim 1 wherein said diene polymer has previously been thickened by heating to a temperature of at least about 200° F.

4. The method of producing a foam which comprises, interreacting a mixture consisting essentially of a liquid diene polymer, an unsaturated carboxylic acid having at least 8 carbon atoms in the molecule and $S_2Cl_2$, the said $S_2Cl_2$ comprising a cross-linking agent and chemically bonding chains of said acid and polymer and providing a source of HCl gas which imparts a cellular structure to the reaction product, the amount of $S_2Cl_2$ being sufficient, depending upon foam rigidity, flexibility or density desired, to cause said product to cure in the foamed state.

5. A resin foam produced by the interreaction of a mixture consisting essentially of a liquid diene polymer, at least one member of the group consisting of unsaturated rosin and unsaturated fatty acids having about 10 to 22 carbon atoms, and sulfur monochloride, the proportions of said ingredients in said mixture depending upon foam rigidity, flexibility or density desired.

6. A foam comprising the product obtained by reacting a mixture consisting essentially of a liquid diene polymer and at least one member of the class consisting of unsaturated rosin and unsaturated fatty acid having about 10 to 22 carbon atoms and mixtures thereof, with sulfur monochloride in amount sufficient, depending upon foam rigidity, flexibility or density desired, to cause said mixture to foam and self cure, wherein said polymer and member of said class are cross-linked with sulfur monochloride as a cross-linking agent.

7. The method of preparing a foamed composition of matter comprising, interreacting at least one liquid diene polymer selected from a first class consisting of butadiene homopolymers, butadiene-styrene copolymers, butadiene-acrylic acid copolymers, butadiene-methacrylic acid copolymers and butadiene-acrylonitrile copolymers with at least one member of a second class consisting of unsaturated rosin and unsaturated fatty acid having about 10 to 22 carbon atoms, and with sulfur monochloride, said interreaction being carried out in the presence of a solvent in which the diene polymer is dissolved, the rosin/polmer weight ratio being less than about 0.50 and the (rosin plus fatty acid)/polymer ratio being in the range of about 0.05–1.6, the sulfur monochloride/polymer ratio being in the approximate range of 0.15 to 1.5.

8. The method of claim 7 wherein the diene polymer is a liquid butadiene polymer having a molecular weight in the approximate range of 500 to 5000.

9. The method of claim 7 wherein both members of said second class are present as tall oil and wherein the ratio of tall oil to diene polymer is in the range of about 0.05–0.50.

10. The method of claim 7 wherein the solvent is an organic solvent which boils in the range of about 5–110° F.

11. As a new composition, the product of the method of claim 7.

12. The method of controlling the reaction of $S_2Cl_2$ with an unsaturated liquid polymer selected from the class consisting of butadiene homopolymers and butadiene copolymers with sytrene, acrylic acid, methacrylic acid and acrylonitrile, to produce a foam, which method comprises, carrying out said reaction in the presence of tall oil and an organic solvent for said polymer boiling in the range of about 5° F.–110° F., the tall oil/polymer weight ratio being about 0.05–1.0 and the sulfur monochloride/polymer ratio being about 0.15–1.60.

13. The method of claim 12 wherein the solvent is selected from the class consisting of pentane, $CCl_3F$, and naphtha.

14. The method which comprises, preparing a mixture consisting essentially of a liquid copolymer of butadiene and styrene having a molecular weight in the range of about 500–5000, tall oil at a tall oil/polymer weight ratio of about 0.05–0.50 and an inert volatilizable organic thinner for said polymer and tall oil, and adding sulfur monochloride to said mixture at a sulfur monochloride/polymer weight ratio of about 0.15–0.5, whereby a self-curing foam is formed.

15. The method of claim 14 wherein said mixture also includes unsaturated rosin in a rosin/polymer ratio less than 0.20.

16. The method which comprises, preparing a mixture comprising,
(a) an unsaturated liquid polymer selected from a first class consisting of butadiene homopolymers, butadiene-styrene copolymers, butadiene-acrylic acid copolymers, butadiene-methacrylic acid copolymers and butadiene-acrylonitrile copolymers;
(b) an inert organic solvent for said polymer boiling in the rang of about 5–300° F.;
(c) at least one member of a second class consisting of unsaturated rosin and unsaturated fatty acid having about 10 to 22 carbon atoms, the rosin/polymer and fatty acid/polymer weight ratios each being more than about 0.05 and the (rosin plus fatty acid)/polymer ratio being less than about 1.0;
(d) a member of the class consisting of alkali metal carbonates and bicarbonates and mixtures thereof in proportions to the polymer of 0 to about 0.3 based upon 47° Bé. aqueous solution;
(e) and adding sulfur monochloride to the mixture so formed at a sulfur monochloride/polymer ratio of about 0.15–1.5, thereby causing a foam to be formed.

17. The method of claim 16 wherein said solvent is selected from the class consisting of pentane, CCl₃, and naphtha.

18. The method of claim 16 wherein said sulfur monochloride/polymer ratio is in the range of about 0.15–0.50 and wherein the (rosin plus fatty acid)/polymer ratio is less than about 0.5.

19. The method of claim 16 wherein said mixture also includes a foam surfactant.

20. The method of producing a foam which comprises, preparing a mixture comprising
(a) an unsaturated liquid butadiene-styrene copolymer having a molecular weight in the range of about 500–5000, and, based upon 100 parts polymer,
(b) 2–5 parts unsaturated rosin,
(c) 5–10 parts tall oil,
(d) 20–30 parts organic solvent for said copolymer,
(e) 0–2 parts sodium silicate 47 Bé. aqueous solution; and
(f) mixing therewith 17–40 parts S₂Cl₂ and permitting the resulting reaction mass to foam and cure.

21. The foam product produced by the reaction of a mixture consisting essentially of an unsaturated liquid polymer selected from a first class consisting of butadiene homopolymers, butadiene-styrene copolymers, butadiene-acrylic acid copolymers, butadiene-methacrylic acid copolymers and butadiene-acrylonitrile copolymers; an inert organic solvent for said polymer; at least one member of a second class consisting of unsaturated rosin and unsaturated fatty acid having about 10 to 22 carbon atoms, the rosin/polymer and fatty acid/polymer weight ratios each being more than about 0.05 and the (rosin plus fatty acid)/polymer ratio being less than about 1.0; a member of the class consisting of alkali metal carbonates and bicarbonates and mixtures thereof in proportions to the polymer of 0 to about 0.3; sodium silicate in proportions to the polymer of 0 to about 0.3 based upon 47 Bé. aqueous silicate solution; and sulfur monochloride at a sulfur monochloride/polymer ratio of about 0.15–1.5.

22. The method which comprises,
(a) dissolving an unsaturated polymer selected from the class consisting of butadiene homopolymers, butadiene-styrene copolymers, butadiene-acrylic acid copolymers, butadiene-methacrylic acid copolymers, butadiene-acrylonitrile copolymers, in an inert organic solvent boiling below about 300° F., and forming a mixture, based upon 100 parts by weight, of the resulting solution with
(b) 5–100 parts of a member of the class of unsaturates consisting of rosin, fatty acid having about 10 to 22 carbon atoms, and mixtures thereof,
(c) 0–30 parts of 47° Be sodium silicate aqueous solution,
(d) 0–30 parts of at least one member of the class consisting of alkali-metal carbonates and bicarbonates,
(e) 0–5 parts of a foam surfactant,
(f) then adding CCl₃F as a propellant to the resulting mixture,
(g) and adding 15–50 parts of sulfur monochloride into the resulting mixture, thereby causing a foam to form.

23. The method of producing a foam which comprises, adding sulfur monochloride to at least one member of a first class consisting of unsaturated fatty acids having about 10 to 22 carbon atoms, unsaturated rosin, tall oil, and an unsaturated liquid diene polymer, said diene polymer being selected from a second class consisting of butadiene homopolymers and copolymers of butadiene with styrene, acrylic acid, methacrylic acid, and acrylonitrile, the amount of sulfur monochloride so added being sufficient to thicken the member of said first class but insufficient to cause frothing or gelaltion, and thereafter reacting the prebodied product so formed to produce a foam with a co-reactant which is a different member of said first class and with sufficient additional sulfur monochloride, depending upon foam rigidity, flexibility or density desired, to produce a self-curing foam.

References Cited

UNITED STATES PATENTS

| | | | |
|---|---|---|---|
| 1,089,482 | 3/1914 | Laarmann | 260—2.5 |
| 1,978,839 | 10/1934 | Gray | 260—777 |
| 2,234,545 | 3/1941 | Auer. | |
| 2,721,185 | 10/1955 | Schulze et al. | |
| 3,022,254 | 2/1962 | Jones et al. | 260—2.5 |

SAMUEL H. BLECH, Primary Examiner

JOHN C. BLEUTGE, Assistant Examiner

U.S. Cl. X.R.

260—23.7, 27, 33.6, 33.8, 79.5, 29.1